(12) United States Patent
Zwiegincew et al.

(10) Patent No.: US 6,317,818 B1
(45) Date of Patent: Nov. 13, 2001

(54) PRE-FETCHING OF PAGES PRIOR TO A HARD PAGE FAULT SEQUENCE

(75) Inventors: Arthur Zwiegincew, Bothell; James E. Walsh, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,499

(22) Filed: Mar. 30, 1999

(51) Int. Cl.$^7$ ................................................. G06F 12/00
(52) U.S. Cl. ............................................................ 711/213
(58) Field of Search ..................................... 711/217, 221, 711/203, 209, 204, 213; 712/207

(56) References Cited

U.S. PATENT DOCUMENTS

| | | | |
|---|---|---|---|
| 5,150,472 | * | 9/1992 | Blank et al. ........................... 395/425 |
| 5,694,568 | * | 12/1997 | Harrison, III et al. ......... 395/421.03 |
| 5,925,100 | * | 7/1999 | Drewry et al. ....................... 709/219 |
| 6,047,363 | * | 4/2000 | Lewchuk ............................... 711/213 |

\* cited by examiner

Primary Examiner—Kevin Verbrugge
(74) Attorney, Agent, or Firm—Merchant & Gould

(57) ABSTRACT

Hard page fault patterns of an application program module are analyzed in order to determine the pages that will be retrieved from disk storage during a common hard page fault scenario. Copies of, or references to, the determined pages are stored in a scenario file, along with an index referred to as a page sequence. The scenario file may also include a prologue indicating events that lead to a hard page fault scenario and an epilogue that may indicate subsequent hard page fault scenarios. Execution of the application program module is monitored to detect the occurrence of a hard page fault scenario. When a hard page fault scenario is detected, a corresponding scenario file is fetched from disk storage and the determined pages, or copies thereof, are transferred into RAM. The determined pages, or copies thereof, may be placed on a stand-by list in RAM and later soft-faulted into the working set of the application program upon request by the application program module, thereby avoiding a sequence of hard page faults.

29 Claims, 3 Drawing Sheets

PRE-FETCHING OF PAGES PRIOR TO A HARD PAGE FAULT SEQUENCE

FIELD OF THE INVENTION

This invention relates in general to the management of pages for improved performance of an application program module during hard page fault intensive scenarios. More particularly, the present invention relates to the reduction of hard page faults by pre-fetching pages into memory prior to the occurrence of a hard page fault sequence.

BACKGROUND OF THE INVENTION

In a computer system, physical memory refers to a hardware device that is capable of storing information. In common usage, physical memory refers to semiconductor storage (RAM) that is connected to the processing unit of the computer system. Many modern processing units and operating systems also support virtual memory. Virtual memory is a technique that allows smaller and/or partially simulated memory devices to be represented as a large uniform primary memory source. In operation, application program modules access memory through virtual addresses, which are then mapped by the operating system in conjunction with a memory management unit (MMU) onto physical memory addresses.

In the context of a paging memory system, a "page" is defined as a fixed-size block of bytes whose physical address can be changed via the MMU, working in conjunction with a Virtual Memory Manager. A page is either mapped onto a physical address or is not present in RAM, in which case it is stored on a disk storage in a page file). A "hard page fault" is an exception that occurs when an application program module attempts to access a virtual memory page that is marked as being not present in RAM. When a hard page fault occurs, the Virtual Memory Manager must access disk storage to retrieve the data for the requested page .

Application program modules are typically disk-bound. In other words, disk access and transfer times are limiting factors of the performance speed of an application program module. Disk access time refers to the time required by a disk drive to access disk storage and respond to a request for a data read or write operation. Therefore, the performance of an application program module is significantly limited during hard page fault intensive scenarios.

There are various potential solutions to the performance bottleneck caused by disk access time during hard page fault scenarios. An obvious potential solution is to reduce disk access time. The reduction of disk access time is primarily a hardware consideration and is not easily accomplished. However, other potential solutions involve the manipulation of memory storage through software program modules.

For example, one prior solution involves manipulating pages such that related blocks of memory are stored together on the same or an adjacent page. More specifically, application program module code is typically stored in pages in the order in which a compiler processed source code, not in the order in which it will be executed. Therefore, when a page is accessed by an application program module, it is likely that only a portion of the requested code is stored thereon and one or more hard page faults will occur to retrieve additional requested code from other pages. Manipulating the pages so that related code is stored on the same or adjacent pages reduces the number of pages required to execute the code and thus reduces hard page faults. Implementing this approach requires an extra per-application effort. Also, it is not always possible to manipulate code in pages in an efficient manner.

Another prior solution involves strategically ordering pages in disk storage. According to this prior solution, the order in which pages will likely be accessed during typical usage of an application program is determined based on the assumption that disk access patterns are similar from run to run. Then, pages are stored in disk storage in the determined order. A strategic ordering of pages will result in a reduction of hard page fault times. However, this approach is somewhat limited by the fact pages may be accessed more than once by an application program. Therefore, additional hard page faults may occur when a particular page must be re-retrieved from disk storage. Strategically ordering pages in disk storage tends to work best when it is employed to reduce hard page faults in a single hard page fault scenario, typically boot.

Another prior technique to reduce the performance bottleneck caused by disk access time during hard page fault scenarios involves decreasing the amount of pages associated with an application program module. Reducing the number of pages containing code executed by an application program module necessarily reduces the number of hard page faults that may possibly occur during execution of the application program module. However, the reduction of memory associated with an application program module requires significant effort on the part of the programmer, or improvements in compiler technologies, to streamline the application program module. Also, end-users demand application program modules having extremely robust functionality and complex graphics capabilities. Thus, it is becoming increasingly more difficult to streamline application program modules while meeting market demands.

Thus, there remains a need for a method and system for improving the performance of an application program module by reducing disk access time without burdening the programmer.

There further remains a need in the art for a method and system for reducing hard page faults during execution of an application program module without detracting from the robustness of the application program module.

SUMMARY OF THE INVENTION

The present invention meets the needs described above by providing a system and method for improving the performance of an application program module by reducing the occurrence of hard page faults during the operation of an application program module. The present invention may be embodied in an add-on software program module that operates in conjunction with the application program module. In this manner, no effort is required on the part of the application programmer to manipulate or modify the application program module in order to improve performance. Furthermore, the add-on software program module does not detract from the intended operation of the application program module.

According to one aspect of the present invention, a scenario file is created which comprises ordered copies of pages that are likely to be retrieved from disk storage by an application program module during a hard page fault. The scenario file is stored in the disk storage. Then, the execution of the application program module is monitored until either an explicit begin-of-scenario instruction is detected, or a hard page fault scenario is detected. A hard page fault scenario may comprise any situation or event that is likely to trigger a hard page fault, i.e., one or more requested pages will not be available in RAM and will be retrieved from disk storage. In response to the detection of a begin-of-scenario instruction or a hard page fault scenario, the scenario file is fetched from disk storage and the ordered copies of the pages are transferred into a standby list in RAM. In this manner, the requested pages will be soft faulted into a working set of the application program module, and no hard page fault will occur. In another aspect of the invention, a hard page fault scenario analyzer is provided for analyzing a hard page fault scenario of an application program module in order to determine the pages that will be retrieved from disk storage upon the occurrence of a hard page fault scenario. The hard page fault scenario analyzer creates a scenario file comprising copies of the pages in the determined order. A hard page fault scenario detector is provided for monitoring the execution of the application module, detecting a hard page fault scenario and sending a message to a pre-fetcher. The hard page fault scenario detector may be manual or automatic. A pre-fetcher retrieves a scenario file from disk storage and transfers the copies of the determined pages into RAM. The copies of the determined pages are placed on a standby list in RAM. Accordingly, the determined pages will be available in RAM during a hard page fault scenario and will be soft-faulted into the working set of the application program module when they are requested by the application program module, thereby avoiding a hard page fault.

According to another aspect of the invention, a scenario file is created which comprises ordered references to pages that are likely to be retrieved from disk storage by an application program module during a hard page fault scenario, rather than the actual pages themselves. The scenario file is stored in the disk storage. Then, the execution of the application program module is monitored until either an explicit begin-of-scenario instruction is detected, or a hard page fault scenario is detected. A hard page fault scenario may comprise any situation or event that is likely to trigger a hard page fault, i.e., one or more requested pages will not be available in RAM and will be retrieved from disk storage. In response to the detection of a begin-of-scenario instruction or a hard page fault scenario, the pages referenced by the scenario file are fetched from disk storage in the optimal manner and are transferred into a standby list in RAM. In this manner, the requested pages will be soft faulted into a working set of the application program module, and no hard page fault will occur. This aspect of the invention will result in more seek operations on disk, but will still allow reading of the required pages in an optimal manner, rather than the 'as needed' ordering if the pages are hard faulted into RAM. This aspect of the invention also reduces the disk space requirements over the previously mentioned aspect.

These and other aspects, features and advantages of the present invention may be more clearly understood and appreciated from a review of the following detailed description of the disclosed embodiments and by reference to the appended drawings and claims.

DETAILED DESCRIPTION

The present invention is directed to a system and method for managing pages in order to improve the performance of an application program module during hard page fault scenarios. The present invention is operable to detect and analyze a potential hard page fault scenario. In analyzing the potential hard page fault scenario, the present invention determines which pages will have to be retrieved from disk upon the occurrence of a hard page fault sequence. Then, prior to the occurrence of the potential hard page fault sequence, the present invention pre-fetches into RAM most, if not all, of the determined pages. Accordingly, no hard page fault will occur when the application program module attempts to access the determined pages. Thus, the performance speed of the application program module is improved due to fewer disk seeks. Those skilled in the art should appreciate that the definition of a hard page fault scenario is arbitrary, i.e., a single lengthy scenario could be 'split' into multiple smaller scenarios. Thus, pages may be pre-fetched in segments, one segment per 'smaller' scenario, resulting in a spreading out of the demand for a single large amount of memory in which to read the prefetched pages.

A hard page fault occurs when a page requested by the application program is not available in RAM. The present invention attempts to determine the order in which pages are likely to be requested in a particular hard page fault scenario. A "scenario file" is created to store a "page sequence," which comprises ordered copies of each determined page. A pre-fetcher is used to load an appropriate scenario file into RAM prior to the occurrence of a particular hard page fault sequence. Then, during the particular hard page fault scenario, the requested pages will be present in RAM and no hard page fault will occur.

Figure 1:
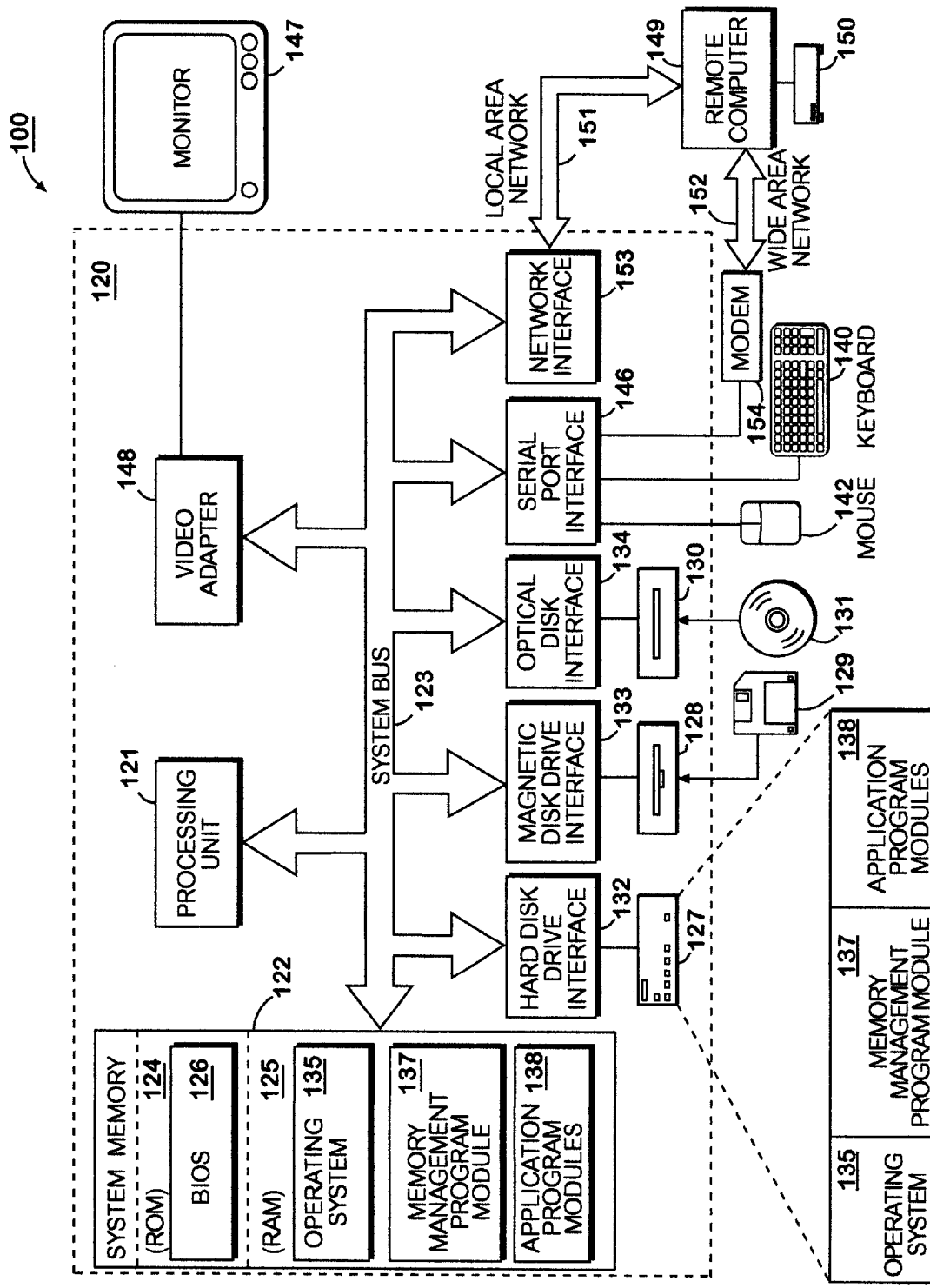
FIG. 1 is a block diagram of a personal computer illustrating an operating environment for an exemplary embodiment of the present invention.

The following description will hereinafter refer to the drawing, in which like numerals indicate like elements throughout the several figures. FIG. 1 and the following discussion are intended to provide a brief and general description of a suitable computing environment 100 for implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a floppy disk drive 128, e.g., to read from or write to a removable magnetic disk 129, and an optical disk drive 130, e.g., for reading a CD-ROM disk 131 or to read from or write to other optical media. The hard disk drive 127, removable magnetic disk drive 128, and optical disk drive 130 are connected to the system bus 123 by a hard disk drive interface 132, a removable magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

The computer system 120 may include additional input devices (not shown), such as a microphone, joystick, game pad, satellite dish, scanner, or the like. These and other input devices are often connected to the processing unit 121 through a serial port interface 146 that is coupled to the system bus 123, but may be connected by other interfaces, such as an IEEE 1394 bus or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules comprise routines, data structures and other software or firmware components. Examples of program modules are operating systems 135 and application program modules 138. In an exemplary embodiment, the present invention may comprise one or more memory management program modules 137 stored on the drives or RAM 125 of the computer 100. Specifically, program modules 137 of the present invention may comprise computer implemented instructions for determining which pages will have to be retrieved from disk during a potential hard page fault scenario and pre-fetching the determined pages into RAM prior to the occurrence of the potential hard page fault sequence.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
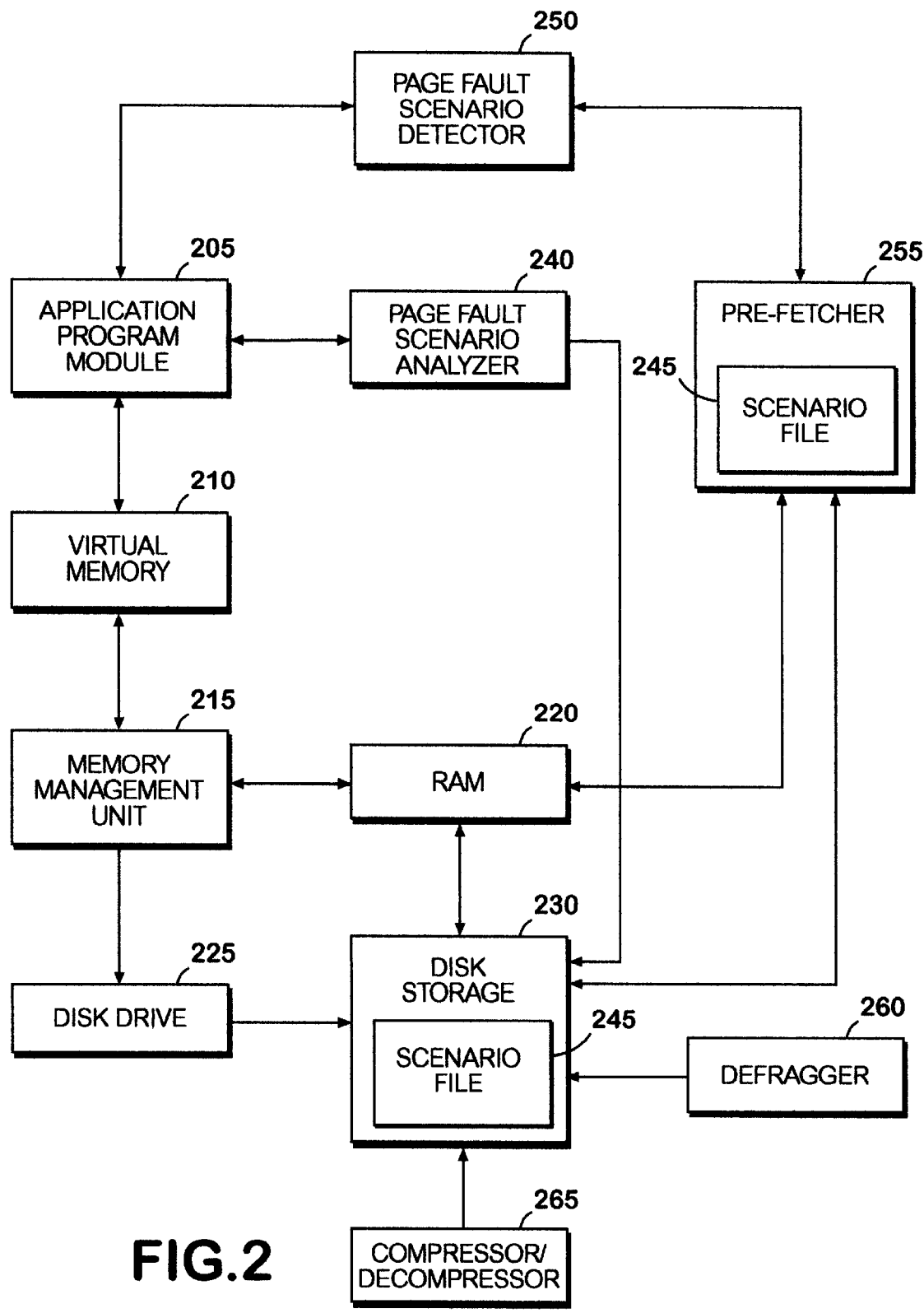
FIG. 2 is a functional block diagram illustrating operation of an exemplary embodiment of the present invention.

FIG. 2 is a functional block diagram illustrating operation of an exemplary embodiment of the present invention. As shown, an application program module 205 interacts with a virtual memory device 210 to access data stored in pages. The virtual memory device 210 communicates with a memory management unit (MMU) 215, which maps virtual memory addresses onto physical memory addresses in the RAM 220 of the computer system. The MMU, which is a well known device, maintains a record of pages present in the RAM 220. An MMU includes a lookaside cache; requests for pages not recorded by the MMU are redirected to the VMM. When the requested pages are not present in the RAM 220, they must be retrieved from disk storage 230. In such a situation, the VMM instructs a disk drive 225 to transfer the requested pages into the RAM 220. Typically, the requested pages are swapped with less used pages in the RAM 220. Accordingly, the least recently used pages are stored on the disk storage 230 and the VMM updates its records to reflect the new pages in the RAM 220. Swapping is a memory management technique that is well known in the art. Those skilled in the art will appreciate that above description of memory management has been provided by way of example only and that other algorithms may be, and often are, employed.

A hard page fault scenario analyzer 240 anticipates and analyzes hard page fault scenarios. As mentioned, a hard page fault scenario is a situation in which a hard page fault sequence is highly likely to occur. The hard page fault scenario analyzer logs various hard page fault scenarios that occur during operation of the application program module 205. The logged hard page fault scenarios are then analyzed to determine if they re-occur frequently, and if they do, they are put in a scenario file. This analysis can occur programmatically on the end-user's computer system, or in advance by the developer of a particular software product. As an example, suppose the application program module 205 is a word processor and that an anticipated hard page fault scenario is the situation in which the user selects a well known "file open" command. In response to the "file open" command, the application program will display a graphical representation of a file directory. However, in order to display the graphical representation of the file directory, a sequence of hard page faults will occur because the word processor must retrieve a particular set of pages from disk. In accordance with an exemplary embodiment of the present invention, the hard page fault scenario analyzer 240 anticipates the "open file" hard page fault scenario of the example and determines the set of pages that will need to be retrieved from disk upon the occurrence of the hard page fault. The determination of pages that will need to be retrieved from disk will be described in greater detail below. The detection of particular classes of hard page fault scenarios may be built into the system. For example, application launch is virtually always a hard page fault scenario, so an exemplary embodiment of the present invention may be configured such that any launch operation of an application program will be considered to be a hard page fault scenario.

Based on the determined pages, the hard page fault scenario analyzer 240 creates a scenario file 245, which is stored in the disk storage 230. The scenario file 245 may comprise ordered copies of the pages that will likely be retrieved from disk due to one or more hard page faults during the hard page fault scenario. The scenario file 245 may comprise multiple copies of a single page. Similarly, multiple scenario files may include copies of the same pages. In this manner, the copies of the pages may be transferred into RAM 220 from the sequence file 245 in the appropriate order without the occurrence of a hard page fault. The transfer of the copies of pages into RAM is discussed below.

A sequence file 245 may also comprise ordered references to the pages that are likely to be retrieved from disk storage 230 during a hard page fault scenario, rather than copies of the actual pages themselves. In response to the detection of a begin-of-scenario instruction or a hard page fault scenario, the pages referenced in the scenario file are fetched from disk storage in the optimal manner and are transferred into RAM. In this manner, the requested pages will be available in RAM when requested, and no hard page fault will occur. This exemplary embodiment of the invention will result in more seek operations on disk, but will still allow reading of the required pages in an optimal manner, rather than the 'as needed' ordering if the pages are hard faulted into RAM. As compared to a scenario file 245 comprising ordered copies of the determined pages, a scenario file comprising references to the determined pages reduces disk space requirements.

The hard page fault scenario analyzer 240 may comprise functionality for automatically analyzing hard page fault scenarios and generating corresponding scenario files. By way of illustration, the hard page fault analyzer 240 may log hard page faults that occur upon execution of a process during operation of an application program module 205. During idle time of the application program module 205, the hard page fault scenario analyzer 240 may write the log of hard page faults to a log file. Then, a pattern matching algorithm may be used to find a pattern of hard page faults based on all log files generated for the process same. If a pattern of hard page faults is found, a new scenario file may be generated based on the pages that are retrieved from disk during the pattern. Automatically generated scenario files may be subject to subsequent refinement, i.e., they may be input into the pattern-matching algorithm.

The hard page fault analyzer 240 may also comprise various application program interfaces (APIs) for allowing an application program module 205 to explicitly designate certain scenarios as hard page fault scenarios and to instruct the hard page fault scenario analyzer 240 to create a corresponding sequence file. Those skilled in the art will appreciate that the use of such APIs is likely to be faster and more accurate than using functionality for automatically analyzing hard page fault scenarios.

A scenario file 245 may further include an index referred to herein as a "page sequence." The elements of a page sequence may be stored as triples in the form of: {image name, page offset, pre-fetch offset}, where a pre-fetch offset is the offset into the scenario file. Physically, a page sequence may be implemented as: {image name, count, (page offset, pre-fetch offset) }.

The scenario file 245 may also comprise various other components, such as a "scenario file ID," a "process image name," a "prologue" and an "epilogue." A scenario file ID may be a standard 128-bit COM GUID, or an equivalent thereof, which is well known in the art. A process image name may allow hard page fault scenarios to be constrained to certain processes (e.g. winword.exe). Prologues and epilogues may be provided as aids for determining the order of hard page fault scenarios. For example, a component of the hard page fault scenario analyzer 240 may be operable to keep track of events leading to and following hard page fault scenarios. A prologue may be used to record events that typically lead to the hard page fault scenario associated with the scenario file 245. The elements of prologues may be stored as pairs in the form of: {image name, page offset}. Similarly, an epilogue may be used to help to predict whether another hard page fault scenario will follow the hard page fault scenario associated with the scenario file 245. For example, an epilogue may be implemented as a list of scenario file IDs, and a decay factor to minimize the number of coincidental hints.

After the hard page fault scenario analyzer 240 has analyzed various hard page fault scenarios of an application program module 205 and has stored corresponding scenario files 245 in the disk storage 230, the hard page fault scenario detector 250 monitors operation of the application program module 205 for the occurrence of a hard page fault scenario. A hard page fault scenario detector may be manual or automatic. A manual hard page fault scenario detector may be programmed to send messages to the pre-fetcher upon the occurrence of particular events. An automatic hard page fault scenario detector may be operable to analyze prologues and epilogues in scenario files to predict when a hard page fault scenario will occur. When the hard page fault scenario detector 250 detects a hard page fault scenario, it sends a message to a pre-fetcher 255. The message sent to the hard page fault scenario detector 250 instructs the pre-fetcher to fetch from disk storage 230 the scenario file 245 associated with the detected hard page fault scenario. A pre-fetcher 255 typically exists as part of an operating system.

In response to the message received from the hard page fault scenario detector 240, the pre-fetcher 255 accesses the disk drive 225 to retrieve the appropriate scenario file from the disk storage 230. The pre-fetcher 255 then transfers into the RAM 220 the page sequence of the retrieved scenario file 245. The newly transferred pages are placed on a standby list in the RAM 220, which is a technique that is well known to those skilled in the art. As such, the newly transferred pages do not increase the working set, i.e., the pages currently utilized by the application program module 205. Then, as the newly transferred pages are requested by the application program 205, they are soft-faulted into the working set and a hard page fault is avoided.

While pre-fetching scenario files 245 into RAM does not increase the working set, it may increase the memory requirements of the computer system. However, those skilled in the art will recognize that not all computer systems will include sufficient memory for proper operation of the exemplary embodiment described above. Accordingly, in low-memory situations, the scenario files may be read in parts, thereby reducing memory requirements. An exemplary embodiment of the present invention includes a defragger 260. The pre-fetching of scenario files may be performed more efficiently when scenario files are physically stored contiguously on the disk storage 230. Many available operating systems include a disk defragger 260. For example, the Windows NT operating system, manufactured and produced by the Microsoft Corporation of Redmond, Wash., supports defragmentation of uncompressed files on 8 KB–64 KB (depending on disk size and user settings) boundaries with the NTFS file system (also manufactured and produced by the Microsoft Corporation). Such available defraggers 260 are sufficient for operation in the present invention. In accordance with an exemplary embodiment, the defragger 260 may be automatically triggered during idle time.

Further, an exemplary embodiment includes a disk compressor/decompressor 265. Well known compression algorithms may be employed to achieve approximately 50% compression with 25 MB/s decompression throughput. These results may be achieved with as little as 64 KB extra memory. Average disk transfer rates are about 8 MB/s. So, for an illustrative 3 MB pre-fetch scenario, comparative pre-fetch times are as follows:

No compression: 0.012 s (seek)+3 MB/8 MB/s (read)=0.3870 s.

50% compression: 0.012 s (seek)+1.5 MB/8 MB/s (read)+3 MB/25 MB/s (decompress)=0.3195 s.

Thus, there is a 17.5% improvement in pre-fetch time using 50% compression.

As described above with reference to FIG. 2, an exemplary embodiment of the present invention may be comprised of various functional components, including a hard page fault scenario analyzer 240, a hard page fault scenario detector 250, a pre-fetcher 255, a disk defragger 260, and a compressor/decompressor 265. However, those having ordinary skill in the art will recognize that the minimum components required to implement the broad concept of the present invention are a manual hard page fault scenario detector 250 and a pre-fetcher 255. As mentioned, a manual hard page fault scenario detector may be programmed to send instructions to the pre-fetcher 255 upon the occurrence of certain events. Those skilled in the art will further appreciate that an automatic hard page fault scenario detector 250, a scenario analyzer 240, a disk defragger 260 and a compressor/decompressor 265 are optimizations for the present invention. The inclusion of such optimizations will depend on the available memory of the computer system on which the present invention will be run and possible gains to be achieved by operation of the present invention.

Figure 3:
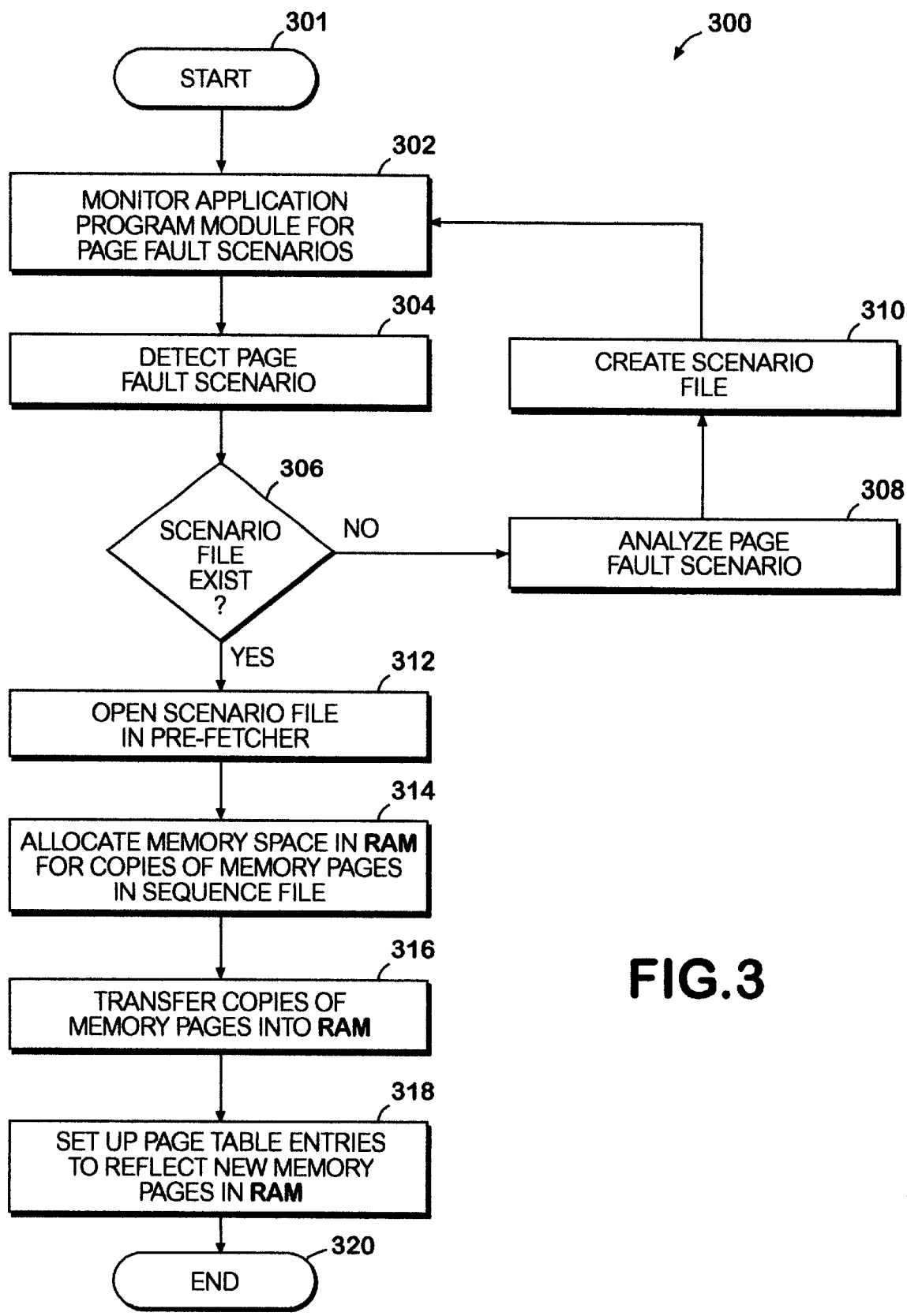
FIG. 3 is a flow diagram illustrating operation of an exemplary embodiment of the present invention.

FIG. 3 is a flow chart illustrating computer implemented steps for carrying out an exemplary method of the present invention. The exemplary method 300 begins at starting block 301 where a computer system, such as the computer 100 of FIG. 1, is executing an application program module, such as the application program module 170 of FIG. 1. At step 302, the application program module is monitored for the occurrence of events that will lead to a hard page fault scenario. At step 304, a hard page fault scenario is detected. As mentioned above, a hard page fault scenario is a situation in which a hard page fault sequence is likely to occur, i.e., requested pages will be unavailable in RAM and must be retrieved from disk storage. Then, at step 306, a determination is made as to whether a scenario file exists that corresponds to the detected hard page fault scenario. As mentioned above with respect to FIG. 2, scenario files may be stored on disk storage. Scenario files comprise either ordered copies of or references to the pages that are determined to be likely to be retrieved from disk storage during a hard page fault. The copies of or references to the determined pages are stored in the order in which they are likely to be requested by the application program module. If no corresponding scenario file is located, the method proceeds to step 308, where the hard page fault scenario is analyzed to determine which pages must be retrieved from disk and in what order. Then, based on the analysis performed at step 308, a scenario file is created for the detected hard page fault scenario at step 310. Subsequently, the method returns to step 302 to continue monitoring the application program module for subsequent hard page fault scenarios.

If at step 306 a scenario file was located that corresponds to the hard page fault scenario detected at step 304, the method proceeds to step 312 where the scenario file is opened and its header is retrieved. Then, at step 314, memory space in RAM is allocated for the determined pages that are copied or referenced in the scenario file. At step 316, the determined pages, or copies thereof, are prefetched into the allocated space in RAM. Lastly, at step 318, page table entries in the Virtual Memory Manager are updated to reflect the new pages transferred into RAM. As described previously, the new pages are pointed to by entries stored in the standby list. Thus, the application program module requests the appropriate pages during the hard page fault scenario, the prefetched pages are soft faulted into the working set of the application program and a hard page fault is avoided.

In view of the foregoing, it will be appreciated that the present invention provides a method and system for improving the performance of an application program module by pre-fetching pages into RAM during hard page fault scenarios, in order to avoid hard page faults. Still, it should be understood that the foregoing relates only to the exemplary embodiments of the present invention, and that numerous changes may be made thereto without departing from the spirit and scope of the invention, as defined by the following claims.

We claim:

1. In a computer system, a method for avoiding hard page faults during a hard page fault scenario of an application program module, the hard page fault scenario comprising a situation in which the application program module attempts to access one or more pages that are unavailable in RAM and must be retrieved from a disk storage, the method comprising the computer implemented steps of:

prior to an occurrence of the hard page fault scenario, determining which pages will be retrieved from disk;

detecting the occurrence of the hard page fault scenario; and in response to detecting the hard page fault scenario, fetching the determined pages into RAM prior to the occurrence of the hard page faults of the hard page fault scenario, whereby the determined pages will be available in RAM and hard page faults will not occur.

2. The method of claim 1, wherein the step of determining which pages will be retrieved from disk during the hard page fault scenario comprises the steps of:

creating a log of hard page faults that occur during operation of the application program module;

analyzing the log to find a common hard page fault scenario; and determining from the log which pages were retrieved from disk during that the common hard page fault scenario.

3. The method of claim 1, further comprising the step of defragging the disk storage.

4. The method of claim 1, wherein the pages are compressed in the disk storage; and wherein the method further comprises the step of decompressing the copies of the determined pages prior to fetching them into the RAM.

5. The method of claim 1, wherein a copy of each of the determined pages is stored in a sequence file; and wherein the step of fetching the determined pages into RAM comprises fetching the copy of each of the determined pages from the sequence file into RAM.

6. The method of claim 5, wherein the sequence file further comprises a prologue indicating one or more events that lead to the hard page fault scenario.

7. The method of claim 5, wherein the sequence file further comprises an epilogue indicating one or more subsequent hard page fault scenarios that are likely to follow the hard page fault scenario.

8. The method of claim 1, wherein a reference to each of the determined pages is stored in a sequence file; and wherein the step of fetching the determined pages into RAM comprise accessing the sequence file in order to locate and fetch the determined pages into memory.

9. The method of claim 8, wherein the sequence file further comprises a prologue indicating one or more events that lead to the hard page fault scenario.

10. The method of claim 8, wherein the sequence file further comprises an epilogue indicating one or more subsequent hard page fault scenarios that are likely to follow the hard page fault scenario.

11. The method of claim 1, wherein fetching the copies of the determined pages into RAM comprises placing the copies of the determined pages on a standby list in the RAM.

12. A computerized system for avoiding a hard page fault during a hard page fault scenario of an application program module, the hard page fault scenario comprising a situation in which the application program module attempts to access one or more determined pages that are unavailable in RAM and must be retrieved from a disk storage, the system comprising:

a hard page fault scenario detector for detecting the occurrence of the hard page fault scenario; and a pre-fetcher for fetching from the disk storage the determined pages into RAM prior to the occurrence of the hard page fault of the hard page fault scenario, the pre-fetcher operating in response to a message received from the hard page fault scenario detector indicating that the hard page fault scenario has been detected, whereby the determined pages will be available in RAM and the hard page fault will not occur.

13. The system of claim 12, wherein the hard page fault scenario detector comprises computer implemented instructions within the application program module for sending the message to the pre-fetcher when a predetermined event occurs.

14. The system of claim 12, wherein a copy of each of the determined pages is stored in a sequence file; and wherein the pre-fetcher fetches the copy of each of the determined pages stored in the sequence file into RAM.

15. The system of claim 14, wherein the sequence file further comprises a prologue indicating events that lead to the occurrence of the hard page fault scenario; and wherein the hard page fault scenario detector is operable to analyze the prologue of the scenario file in order to detect the hard page fault scenario.

16. The system of claim 14, wherein the sequence file further comprises an epilogue indicating one or more subsequent hard page fault scenarios that are likely to follow the hard page fault scenario.

17. The system of claim 12, wherein a reference to each of the determined pages is stored in a sequence file; and wherein the pre-fetcher accesses the sequence file in order to locate and fetch the determined pages into RAM.

18. The system of claim 17, wherein the sequence file further comprises a prologue indicating events that lead to the occurrence of the hard page fault scenario; and wherein the hard page fault scenario detector is operable to analyze the prologue of the scenario file in order to detect the hard page fault scenario.

19. The system of claim 17, wherein the sequence file further comprises an epilogue indicating one or more subsequent hard page fault scenarios that are likely to follow the hard page fault scenario.

20. The system of claim 12, further comprising a hard page fault scenario analyzer for analyzing the hard page fault scenario in order to predetermine which pages will be retrieved from disk during the hard page fault of the hard page fault scenario and create a scenario file comprising the copies of the predetermined pages.

21. The system of claim 12, further comprising a defragger for defragging the disk storage.

22. The system of claim 12, further comprising a compressor/decompressor for compressing the pages stored in the disk storage and decompressing the copies of the predetermined pages prior to fetching them into the RAM.

23. The system of claim 12, wherein the pre-fetcher fetches the copies of the predetermined pages into RAM by placing the copies of the predetermined pages on a standby list in the RAM.

24. A data structure stored on a computer readable medium for use in conjunction with an application program module for avoiding a sequence of hard page faults during a hard page fault scenario of the application program, the data structure comprising:

a page sequence index comprising ordered identifiers of one or more pages that are likely to be retrieved from a disk storage during the sequence of hard page faults; and copies of the plurality of pages that are likely to be retrieved from a disk storage during the sequence of hard page faults.

25. The data structure of claim 24, further comprising a prologue for indicating one or more events that typically lead to the hard page fault scenario.

26. The data structure of claim 24, further comprising an epilogue for indicating one or more subsequent hard page fault scenarios that typically follow the hard page fault scenario.

27. A data structure stored on a computer readable medium for use in conjunction with an application program module for avoiding a sequence of hard page faults during a hard page fault scenario of the application program, the data structure comprising:

a page sequence index comprising ordered identifiers of one or more pages that are likely to be retrieved from a disk storage during the sequence of hard page faults; and references to the plurality of pages that are likely to be retrieved from a disk storage during the sequence of hard page faults.

28. The data structure of claim 27, further comprising a prologue for indicating one or more events that typically lead to the hard page fault scenario.

29. The data structure of claim 27, further comprising an epilogue for indicating one or more subsequent hard page fault scenarios that typically follow the hard page fault scenario.

* * * * *